US012095175B2

(12) United States Patent
Wang et al.

(10) Patent No.: US 12,095,175 B2
(45) Date of Patent: Sep. 17, 2024

(54) ANTENNA STRUCTURE

(71) Applicant: Cheng Uei Precision Industry Co., LTD., New Taipei (TW)

(72) Inventors: Chih-Chung Wang, New Taipei (TW); Lan-Yung Hsiao, New Taipei (TW); Ming-Ju Lin, New Taipei (TW); Shao-Kai Sun, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 261 days.

(21) Appl. No.: 17/942,142

(22) Filed: Sep. 11, 2022

(65) Prior Publication Data

US 2023/0216195 A1 Jul. 6, 2023

(30) Foreign Application Priority Data

Jan. 4, 2022 (CN) ......................... 202220008152.6

(51) Int. Cl.
*H01Q 5/30* (2015.01)
*H01Q 1/48* (2006.01)
*H01Q 9/06* (2006.01)

(52) U.S. Cl.
CPC ................. *H01Q 5/30* (2015.01); *H01Q 1/48* (2013.01); *H01Q 9/06* (2013.01); *H01Q 9/065* (2013.01)

(58) Field of Classification Search
CPC ............ H01Q 5/30; H01Q 1/48; H01Q 9/065; H01Q 9/06
See application file for complete search history.

(56) References Cited

U.S. PATENT DOCUMENTS 9,570,805 B2 * 2/2017 Lai ........................... H01Q 9/42
2013/0241777 A1 * 9/2013 Chang ...................... H01Q 9/42 343/700 MS
2015/0061943 A1 * 3/2015 Chi ........................ H01Q 5/378 343/700 MS
2015/0077307 A1 * 3/2015 Liou ........................ H01Q 7/00 343/866
2015/0188214 A1 * 7/2015 Chang .................... H01Q 1/243 343/702
2022/0336956 A1 * 10/2022 Tai ......................... H01Q 5/371
2023/0178887 A1 * 6/2023 Chiang .................. H01Q 5/328 343/702
2023/0216177 A1 * 7/2023 Wu .......................... H01Q 1/38 343/702

* cited by examiner

*Primary Examiner* — Hai V Tran
(74) *Attorney, Agent, or Firm* — Cheng-Ju Chiang

(57) ABSTRACT

An antenna structure includes a substrate, a radiator mounted at an upper portion of a front surface of the substrate, and a grounding element mounted at a lower portion of the front surface of the substrate. The radiator has a first radiating portion. A lower edge of the first radiating portion extends downward to form a second radiating portion. Two portions of a middle of the lower edge of the first radiating portion extend downward to form a third radiating portion and a feeding portion. A free end of the feeding portion is a feeding end. One side edge of the first radiating portion is recessed inward to form a recess. The grounding element has a first grounding portion and a second grounding portion. The first grounding portion and the second grounding portion are located to two sides of the feeding portion, respectively.

18 Claims, 7 Drawing Sheets

| Frequency Band | Frequency (MHz) | Efficiency (%) |
|---|---|---|
| 700 | 704-824 | 51.26 |
| 800 | 791-894 | 54.45 |
| 900 | 880-960 | 57.32 |
| 1800 | 1710-1890 | 82.56 |
| 1900 | 1845-1995 | 90.17 |
| 2100 | 1920-2170 | 84.54 |
| 2300 | 2300-2360 | 75.19 |
| 2600 | 2500-2690 | 60.02 |
| 3500 | 3300-3800 | 62.26 |
| 4500 | 4400-5000 | 47.45 |

FIG. 7

ANTENNA STRUCTURE

CROSS-REFERENCE TO RELATED APPLICATION

The present application is based on, and claims priority from, China Patent Application No. 202220008152.6, filed Jan. 4, 2022, the disclosure of which is hereby incorporated by reference herein in its entirety.

BACKGROUND OF THE INVENTION

1. Field of the Invention

The present invention generally relates to an antenna structure, and more particularly to an antenna structure with multiple frequency bands.

2. The Related Art

In response to a development of 5G (Fifth Generation) mobile communication technology, in the SUB-6G frequency band, the n77 frequency band, the n78 frequency band and the n79 frequency band need to be added to an existing 4G frequency band. Under current multiple frequency band demands for mobile communications, how to provide multiple frequency bands in a limited space of an antenna structure has become a challenge.

Internet of Things (IoT) antennas on the market are used in various devices, in order to make the Internet of Things antennas be applied to different scenarios, the Internet of Things antennas are necessary to have high performances. Under a device miniaturization trend, more antenna structures with the multiple frequency bands and smaller sizes need supporting.

Thus, it is necessary to provide an antenna structure with multiple frequency bands, the antenna structure is capable of having a multiple frequency band function in a limited space.

SUMMARY OF THE INVENTION

An object of the present invention is to provide an antenna structure with multiple frequency bands. The antenna structure includes a substrate, a radiator mounted at an upper portion of a front surface of the substrate, and a grounding element mounted at a lower portion of the front surface of the substrate. The radiator has a first radiating portion. One side of a lower edge of the first radiating portion extends downward to form a second radiating portion. Two portions of a middle of the lower edge of the first radiating portion extend downward to form a third radiating portion and a feeding portion. The third radiating portion is spaced from the feeding portion. The feeding portion is located between the second radiating portion and the third radiating portion, and a free end of the feeding portion is a feeding end. A lower portion of one side edge of the first radiating portion is recessed inward to form a recess. The grounding element has a first grounding portion, a second grounding portion and a connecting portion. The connecting portion is located under the radiator. Two sides of a top edge of the connecting portion extend upward to form the first grounding portion and the second grounding portion. The first grounding portion and the second grounding portion are located to two sides of the feeding portion, respectively. The first grounding portion and the second grounding portion are spaced from the two sides of the feeding portion, respectively.

Another object of the present invention is to provide an antenna structure. The antenna structure includes a substrate, a radiator mounted at an upper portion of a front surface of the substrate, and a grounding element mounted at a lower portion of the front surface of the substrate. The radiator has a first radiating portion. One side of a lower edge of the first radiating portion extends downward to form a second radiating portion. Two portions of a middle of the lower edge of the first radiating portion extend downward to form a third radiating portion and a feeding portion. The third radiating portion is spaced from the feeding portion. The feeding portion is located between the second radiating portion and the third radiating portion, and a free end of the feeding portion is a feeding end. A lower portion of one side edge of the first radiating portion is recessed inward to form a recess. The grounding element has a first grounding portion, a second grounding portion and a connecting portion. The connecting portion is located under the radiator. Two sides of a top edge of the connecting portion extend upward to form the first grounding portion and the second grounding portion. The first grounding portion is spaced from the second grounding portion. A lower half of the feeding portion is located between the first grounding portion and the second grounding portion. The first grounding portion and the second grounding portion are spaced from the feeding portion. The feeding portion, the first grounding portion and the second grounding portion form a coplanar waveguide structure.

Another object of the present invention is to provide an antenna structure. The antenna structure includes a substrate, a radiator mounted at an upper portion of a front surface of the substrate, and a grounding element mounted at a lower portion of the front surface of the substrate. The radiator has a first radiating portion. One side of a lower edge of the first radiating portion extends downward to form a second radiating portion. Two portions of a middle of the lower edge of the first radiating portion extend downward to form a third radiating portion and a feeding portion. The third radiating portion is spaced from the feeding portion. The feeding portion is located between the second radiating portion and the third radiating portion, and a free end of the feeding portion is a feeding end. A lower portion of one side edge of the first radiating portion is recessed inward to form a recess. The grounding element has a first grounding portion, a second grounding portion and a connecting portion. The connecting portion is located under the radiator. Two sides of a top edge of the connecting portion extend upward to form the first grounding portion and the second grounding portion. The first grounding portion and the second grounding portion are located to two sides of the feeding portion, respectively. The first grounding portion and the second grounding portion are spaced from the two sides of the feeding portion, respectively. The free end of the feeding portion faces towards a middle of the top edge of the connecting portion. The free end of the feeding portion is spaced from the middle of the top edge of the connecting portion. The feeding portion, the first grounding portion and the second grounding portion form a coplanar waveguide structure.

As described above, the antenna structure is a dipole antenna structure, the first radiating portion of the radiator is operated at frequencies which are ranged from 704 MHz to 960 MHz, the second radiating portion of the radiator is operated at frequencies which are ranged from 3300 MHz to 3800 MHz, and the third radiating portion of the radiator is operated at frequencies which are ranged from 4400 MHz to 5000 MHz. Moreover, the feeding portion, the first grounding portion and the second grounding portion form the coplanar waveguide structure, the first grounding portion of the grounding element is operated at frequencies which are ranged from 2300 MHz to 2600 MHz, and the second grounding portion of the grounding element is operated at frequencies which are ranged from 1710 MHz to 2170 MHz. In that case, the antenna structure is with the multiple frequency bands, the antenna structure is capable of having a multiple frequency band function in a limited space, so application frequency bands of the antenna structure are wider, and an area of the antenna structure is able to be used more effectively to save a space.

BRIEF DESCRIPTION OF THE DRAWINGS

The present invention will be apparent to those skilled in the art by reading the following description, with reference to the attached drawings, in which:

FIG. 7 is a table showing average values of radiation efficiencies corresponding to frequency bands of the antenna structure in accordance with the preferred embodiment of the present invention.

DETAILED DESCRIPTION OF THE PREFERRED EMBODIMENT

Figure 1:
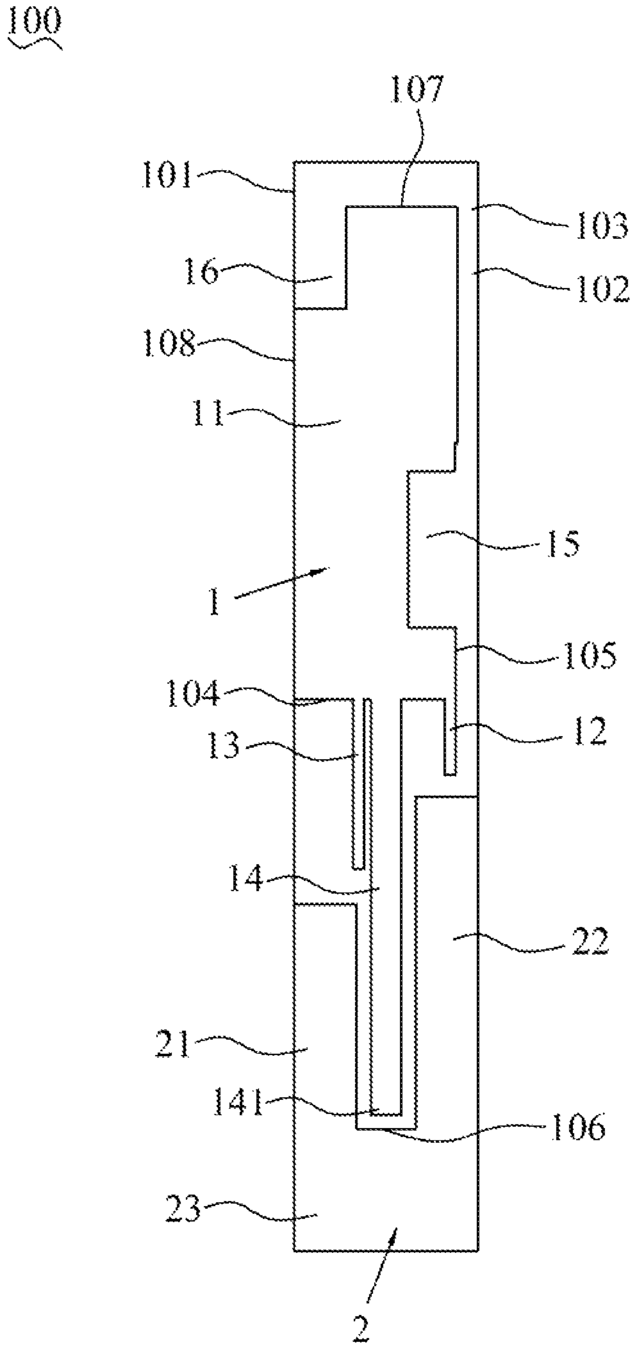
FIG. 1 is a perspective view of an antenna structure in accordance with a preferred embodiment of the present invention.

With reference to FIG. 1, an antenna structure 100 in accordance with a preferred embodiment of the present invention is shown. The antenna structure 100 includes a substrate 101, a radiator 1 and a grounding element 2. The radiator 1 and the grounding element 2 are disposed at a surface 102 of the antenna structure 100. The antenna structure 100 is a dipole antenna structure.

Figure 2:
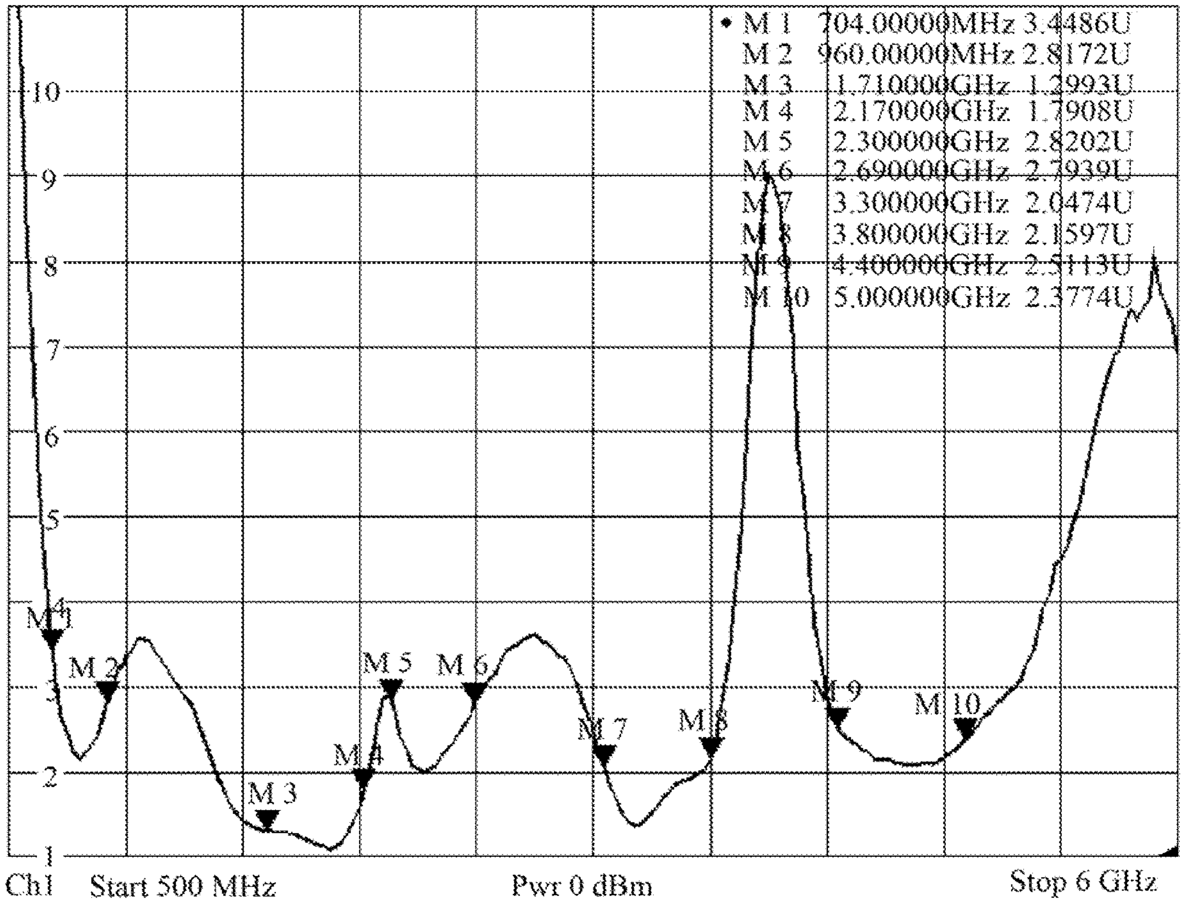
FIG. 2 is a voltage standing wave ratio test chart of the antenna structure that shows operating frequencies of a resonance of the antenna structure in accordance with the preferred embodiment of the present invention.

Referring to FIG. 1 and FIG. 2, the radiator 1 is located at an upper portion of the surface 102 of the antenna structure 100. The radiator 1 is mounted at an upper portion of a front surface 103 of the substrate 101. The radiator 1 has a first radiating portion 11. One side of a lower edge 104 of the first radiating portion 11 extends downward to form a second radiating portion 12. Two portions of a middle of the lower edge 104 of the first radiating portion 11 extend downward to form a third radiating portion 13 and a feeding portion 14. The third radiating portion 13 is spaced from the feeding portion 14. The feeding portion 14 is located between the second radiating portion 12 and the third radiating portion 13. The feeding portion 14 is spaced from the second radiating portion 12 and the third radiating portion 13. A free end of the feeding portion 14 is a feeding end 141.

The second radiating portion 12 is shorter than the third radiating portion 13 in a longitudinal direction. The third radiating portion 13 is shorter than the feeding portion 14 in the longitudinal direction. The second radiating portion 12, the third radiating portion 13 and the feeding portion 14 are rectangular. The feeding portion 14 is wider than the second radiating portion 12 and the third radiating portion 13 along a transverse direction. A lower portion of one side edge 105 of the first radiating portion 11 is recessed inward to form a recess 15. The recess 15 is corresponding to the second radiating portion 12 in the longitudinal direction. A corner formed between an upper edge 107 of the first radiating portion 11 and the other side edge 108 of the first radiating portion 11 is recessed inward to form a cut 16. So the first radiating portion 11 is operated at frequencies which are ranged from 704 MHz to 960 MHz. The second radiating portion 12 is operated at frequencies which are ranged from 3300 MHz to 3800 MHz. The third radiating portion 13 is operated at frequencies which are ranged from 4400 MHz to 5000 MHz.

The grounding element 2 is located at a lower portion of the surface 102 of the antenna structure 100. The grounding element 2 is mounted at a lower portion of the front surface 103 of the substrate 101. The grounding element 2 has a first grounding portion 21, a second grounding portion 22 and a connecting portion 23. The connecting portion 23 is rectangular. The connecting portion 23 is located under the radiator 1. Two sides of a top edge 106 of the connecting portion 23 extend upward to form the first grounding portion 21 and the second grounding portion 22. The first grounding portion 21 is spaced from the second grounding portion 22. The first grounding portion 21 and the second grounding portion 22 are rectangular. The first grounding portion 21 is shorter than the second grounding portion 22 in the longitudinal direction.

The first grounding portion 21 is located under the third radiating portion 13. The first grounding portion 21 is spaced from the third radiating portion 13. The second grounding portion 22 is located under the second radiating portion 12. The second grounding portion 22 is spaced from the second radiating portion 12. A lower half of the feeding portion 14 is located between the first grounding portion 21 and the second grounding portion 22. The first grounding portion 21 and the second grounding portion 22 are spaced from the feeding portion 14. The first grounding portion 21 and the second grounding portion 22 are located to two sides of the feeding portion 14, respectively. The first grounding portion 21 and the second grounding portion 22 are spaced from the two sides of the feeding portion 14, respectively. The free end of the feeding portion 14 faces towards a middle of the top edge 106 of the connecting portion 23. The free end of the feeding portion 14 is spaced from the middle of the top edge 106 of the connecting portion 23. The feeding end 141 of the feeding portion 14 faces towards the middle of the top edge 106 of the connecting portion 23. The feeding end 141 of the feeding portion 14 is spaced from the middle of the top edge 106 of the connecting portion 23.

The feeding portion 14, the first grounding portion 21 and the second grounding portion 22 form a coplanar waveguide (CPW) structure. The first grounding portion 21 is operated at frequencies which are ranged from 2300 MHz to 2600 MHz. The second grounding portion 22 is operated at frequencies which are ranged from 1710 MHz to 2170 MHz.

Figure 3:
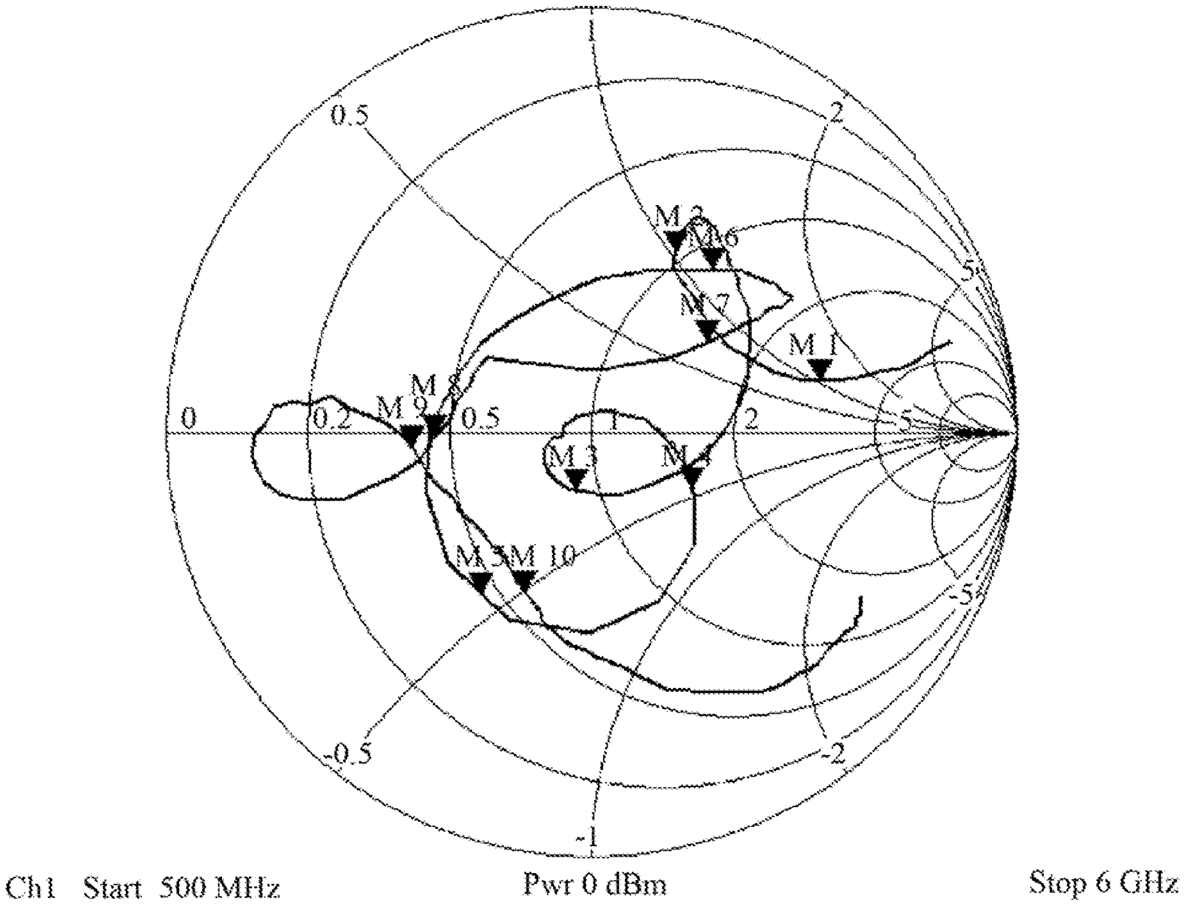
FIG. 3 is a Smith chart of the antenna structure in accordance with the preferred embodiment of the present invention.

With reference to FIG. 1 to FIG. 3, a voltage standing wave ratio (VSWR) test chart of the antenna structure 100 is shown in FIG. 2. A Smith chart of the antenna structure 100 is shown in FIG. 3. When the antenna structure 100 is operated at 704 MHz, a voltage standing wave ratio value of the antenna structure 100 is 3.4486 which is shown at a position M1 of FIG. 2. When the antenna structure 100 is operated at 960 MHz, the voltage standing wave ratio value of the antenna structure 100 is 2.8172 which is shown at a position M2 of FIG. 2. When the antenna structure 100 is operated at 1710 MHz, the voltage standing wave ratio value of the antenna structure 100 is 1.2993 which is shown at a position M3 of FIG. 2. When the antenna structure 100 is operated at 2170 MHz, the voltage standing wave ratio value of the antenna structure 100 is 1.7908 which is shown at a position M4 of FIG. 2. When the antenna structure 100 is operated at 2300 MHz, the voltage standing wave ratio value of the antenna structure 100 is 2.8202 which is shown at a position M5 of FIG. 2. When the antenna structure 100 is operated at 2690 MHz, the voltage standing wave ratio value of the antenna structure 100 is 2.7939 which is shown at a position M6 of FIG. 2. When the antenna structure 100 is operated at 3300 MHz, the voltage standing wave ratio value of the antenna structure 100 is 2.0474 which is shown at a position M7 of FIG. 2. When the antenna structure 100 is operated at 3800 MHz, the voltage standing wave ratio value of the antenna structure 100 is 2.1597 which is shown at a position M8 of FIG. 2. When the antenna structure 100 is operated at 4400 MHz, the voltage standing wave ratio value of the antenna structure 100 is 2.5113 which is shown at a position M9 of FIG. 2. When the antenna structure 100 is operated at 5000 MHz, the voltage standing wave ratio value of the antenna structure 100 is 2.3774 which is shown at a position M10 of FIG. 2. Therefore, the antenna structure 100 is able to be stably operated at the frequencies which are ranged from 704 MHz to 960 MHz, the frequencies which are ranged from 1710 MHz to 2170 MHz, the frequencies which are ranged from 2300 MHz to 2600 MHz, the frequencies which are ranged from 3300 MHz to 3800 MHz and the frequencies which are ranged from 4400 MHz to 5000 MHz.

Figure 4:
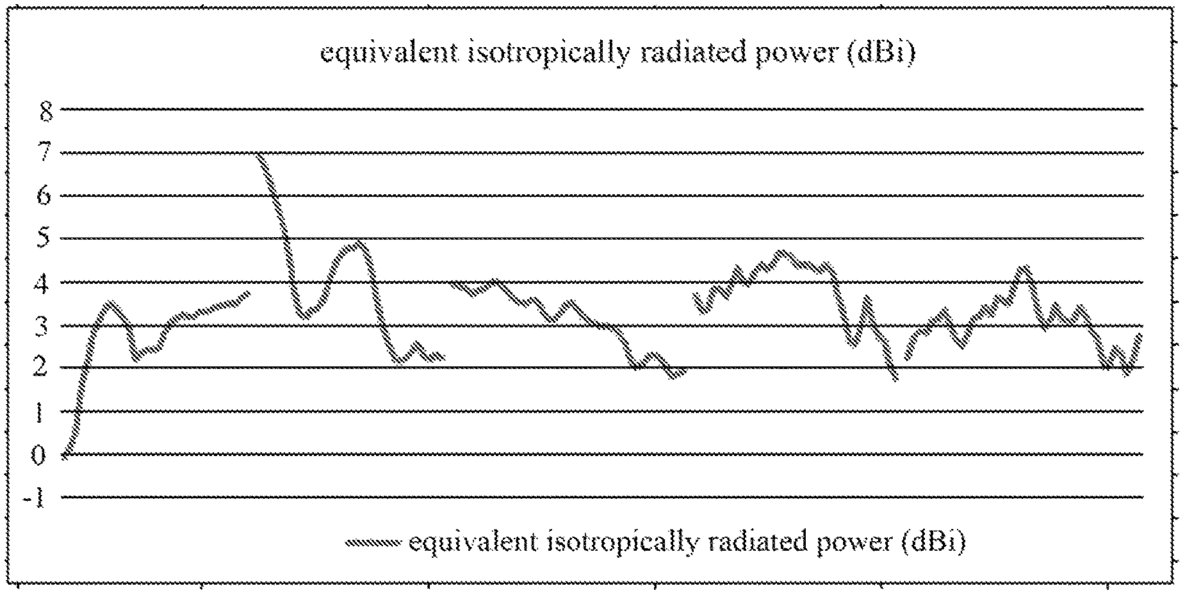
FIG. 4 is an equivalent isotropically radiated power chart of the antenna structure in accordance with the preferred embodiment of the present invention.

With reference to FIG. 1 and FIG. 4, an equivalent isotropically radiated power chart of the antenna structure 100 is shown in FIG. 4. A maximum value of radiated power of the antenna structure 100 which is operated at each frequency is shown in FIG. 4. In this preferred embodiment, peak values of the equivalent isotropically radiated power of the antenna structure 100 in a full frequency band fall within the same range, that is to say, the radiated power of the antenna structure 100 is stable.

Referring to FIG. 1 and FIG. 7, a table showing average values of radiation efficiencies corresponding to frequency bands of the antenna structure 100 is shown in FIG. 7. When the antenna structure 100 is operated at a frequency band of 700 MHz, the antenna structure 100 is operated at the frequencies which are ranged from 704 MHz to 824 MHz, an average value of a radiation efficiency of the antenna structure 100 is 51.26%. When the antenna structure 100 is operated at a frequency band of 800 MHz, the antenna structure 100 is operated at the frequencies which are ranged from 791 MHz to 894 MHz, the average value of the radiation efficiency of the antenna structure 100 is 54.45%. When the antenna structure 100 is operated at a frequency band of 900 MHz, the antenna structure 100 is operated at the frequencies which are ranged from 880 MHz to 960 MHz, the average value of the radiation efficiency of the antenna structure 100 is 57.32%. When the antenna structure 100 is operated at a frequency band of 1800 MHz, the antenna structure 100 is operated at the frequencies which are ranged from 1710 MHz to 1890 MHz, the average value of the radiation efficiency of the antenna structure 100 is 82.56%. When the antenna structure 100 is operated at a frequency band of 1900 MHz, the antenna structure 100 is operated at the frequencies which are ranged from 1845 MHz to 1995 MHz, the average value of the radiation efficiency of the antenna structure 100 is 90.17%. When the antenna structure 100 is operated at a frequency band of 2100 MHz, the antenna structure 100 is operated at the frequencies which are ranged from 1920 MHz to 2170 MHz, the average value of the radiation efficiency of the antenna structure 100 is 84.54%. When the antenna structure 100 is operated at a frequency band of 2300 MHz, the antenna structure 100 is operated at the frequencies which are ranged from 2300 MHz to 2360 MHz, the average value of the radiation efficiency of the antenna structure 100 is 75.19%. When the antenna structure 100 is operated at a frequency band of 2600 MHz, the antenna structure 100 is operated at the frequencies which are ranged from 2500 MHz to 2690 MHz, the average value of the radiation efficiency of the antenna structure 100 is 60.02%. When the antenna structure 100 is operated at a frequency band of 3500 MHz, the antenna structure 100 is operated at the frequencies which are ranged from 3300 MHz to 3800 MHz, the average value of the radiation efficiency of the antenna structure 100 is 62.26%. When the antenna structure 100 is operated at a frequency band of 4500 MHz, the antenna structure 100 is operated at the frequencies which are ranged from 4400 MHz to 5000 MHz, the average value of the radiation efficiency of the antenna structure 100 is 47.45%.

Figure 5:
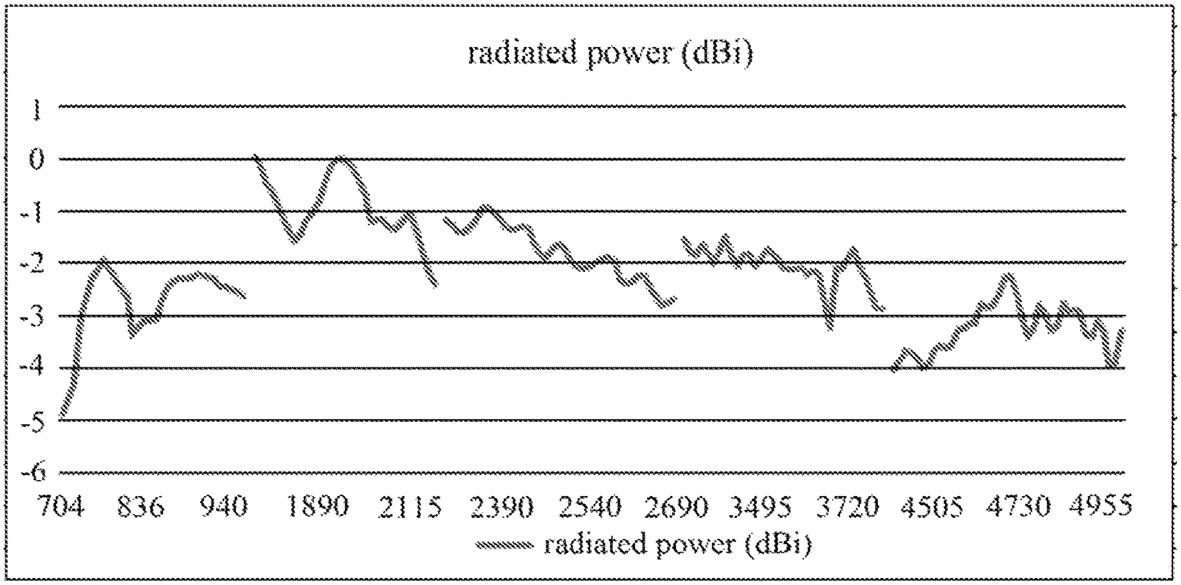
FIG. 5 is a radiated power chart of the antenna structure in accordance with the preferred embodiment of the present invention.
Figure 6:
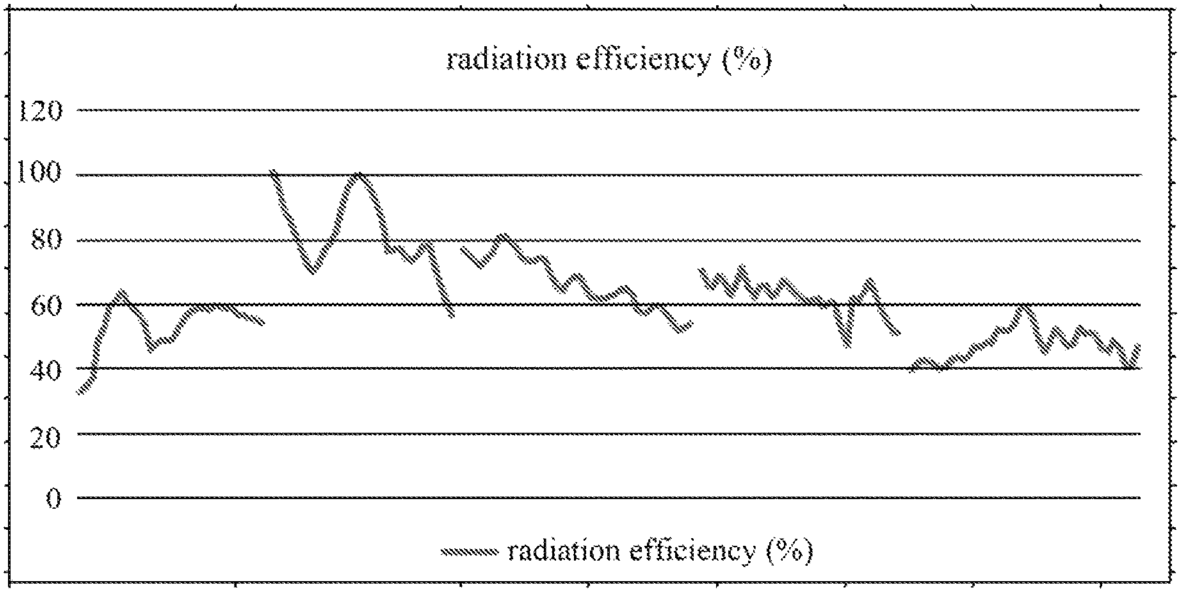
FIG. 6 is a radiation efficiency chart of the antenna structure in accordance with the preferred embodiment of the present invention.

With reference to FIG. 1 to FIG. 7, a radiated power chart of the antenna structure 100 is shown in FIG. 5, and a radiation efficiency chart of the antenna structure 100 is shown in FIG. 6. The radiated power of the antenna structure 100 is able to be converted to the radiation efficiency of the antenna structure 100. Average power of the antenna structure 100 is converted into the average values of the radiation efficiencies of the antenna structure 100. When the antenna structure 100 is operated at the different frequencies, the higher a value of the radiation efficiency is, the better the antenna structure 100 is. In this preferred embodiment, the average values of the radiation efficiencies which are corresponding to lower frequency bands are above 50%. Therefore, the antenna structure 100 is able to achieve higher values of the radiation efficiencies which are corresponding to the lower frequency bands in a limited space, and the antenna structure 100 is able to maintain higher frequency bands, and the radiation efficiencies which are corresponding to the higher frequency bands in the limited space.

As described above, the antenna structure 100 is the dipole antenna structure, the first radiating portion 11 of the radiator 1 is operated at the frequencies which are ranged from 704 MHz to 960 MHz, the second radiating portion 12 of the radiator 1 is operated at the frequencies which are ranged from 3300 MHz to 3800 MHz, and the third radiating portion 13 of the radiator 1 is operated at the frequencies which are ranged from 4400 MHz to 5000 MHz. Moreover, the feeding portion 14, the first grounding portion 21 and the second grounding portion 22 form the coplanar waveguide structure, the first grounding portion 21 of the grounding element 2 is operated at the frequencies which are ranged from 2300 MHz to 2600 MHz, and the second grounding portion 22 of the grounding element 2 is operated at the frequencies which are ranged from 1710 MHz to 2170 MHz. In that case, the antenna structure 100 is with the multiple frequency bands, the antenna structure 100 is capable of having a multiple frequency band function in the limited space, so application frequency bands of the antenna structure 100 is wider, and an area of the antenna structure 100 is able to be used more effectively to save a space.

What is claimed is:

1. An antenna structure, comprising:

a substrate;

a radiator mounted at an upper portion of a front surface of the substrate, the radiator having a first radiating portion, one side of a lower edge of the first radiating portion extending downward to form a second radiating portion, two portions of a middle of the lower edge of the first radiating portion extending downward to form a third radiating portion and a feeding portion, the third radiating portion being spaced from the feeding portion, the feeding portion being located between the second radiating portion and the third radiating portion, and a free end of the feeding portion being a feeding end, a lower portion of one side edge of the first radiating portion being recessed inward to form a recess; and a grounding element mounted at a lower portion of the front surface of the substrate, the grounding element having a first grounding portion, a second grounding portion and a connecting portion, the connecting portion being located under the radiator, two sides of a top edge of the connecting portion extending upward to form the first grounding portion and the second grounding portion, the first grounding portion and the second grounding portion being located to two sides of the feeding portion, respectively, the first grounding portion and the second grounding portion being spaced from the two sides of the feeding portion, respectively.

2. The antenna structure as claimed in claim 1, wherein the second radiating portion is shorter than the third radiating portion in a longitudinal direction.

3. The antenna structure as claimed in claim 1, wherein the third radiating portion is shorter than the feeding portion in the longitudinal direction.

4. The antenna structure as claimed in claim 1, wherein the second radiating portion, the third radiating portion and the feeding portion are rectangular.

5. The antenna structure as claimed in claim 1, wherein the feeding portion is wider than the second radiating portion and the third radiating portion along a transverse direction.

6. The antenna structure as claimed in claim 1, wherein the first radiating portion is operated at frequencies which are ranged from 704 MHz to 960 MHz, the second radiating portion is operated at frequencies which are ranged from 3300 MHz to 3800 MHz, the third radiating portion is operated at frequencies which are ranged from 4400 MHz to 5000 MHz.

7. The antenna structure as claimed in claim 1, wherein the connecting portion is rectangular, the first grounding portion and the second grounding portion are rectangular.

8. The antenna structure as claimed in claim 1, wherein the first grounding portion is shorter than the second grounding portion in a longitudinal direction.

9. The antenna structure as claimed in claim 1, wherein the first grounding portion is located under the third radiating portion, the first grounding portion is spaced from the third radiating portion, the second grounding portion is located under the second radiating portion, the second grounding portion is spaced from the second radiating portion.

10. The antenna structure as claimed in claim 1, wherein a lower half of the feeding portion is located between the first grounding portion and the second grounding portion, the free end of the feeding portion faces towards a middle of the top edge of the connecting portion, the free end of the feeding portion is spaced from the middle of the top edge of the connecting portion.

11. The antenna structure as claimed in claim 1, wherein the feeding portion, the first grounding portion and the second grounding portion form a coplanar waveguide structure.

12. The antenna structure as claimed in claim 1, wherein the first grounding portion is operated at frequencies which are ranged from 2300 MHz to 2600 MHz, the second grounding portion is operated at frequencies which are ranged from 1710 MHz to 2170 MHz.

13. The antenna structure as claimed in claim 1, wherein the antenna structure is a dipole antenna structure.

14. The antenna structure as claimed in claim 1, wherein the recess is corresponding to the second radiating portion in a longitudinal direction.

15. The antenna structure as claimed in claim 1, wherein a corner formed between an upper edge of the first radiating portion and the other side edge of the first radiating portion is recessed inward to form a cut.

16. The antenna structure as claimed in claim 1, wherein the feeding end of the feeding portion faces towards a middle of the top edge of the connecting portion, the feeding end of the feeding portion is spaced from the middle of the top edge of the connecting portion.

17. An antenna structure, comprising:

a substrate;

a radiator mounted at an upper portion of a front surface of the substrate, the radiator having a first radiating portion, one side of a lower edge of the first radiating portion extending downward to form a second radiating portion, two portions of a middle of the lower edge of the first radiating portion extending downward to form a third radiating portion and a feeding portion, the third radiating portion being spaced from the feeding portion, the feeding portion being located between the second radiating portion and the third radiating portion, and a free end of the feeding portion being a feeding end, a lower portion of one side edge of the first radiating portion being recessed inward to form a recess; and a grounding element mounted at a lower portion of the front surface of the substrate, the grounding element having a first grounding portion, a second grounding portion and a connecting portion, the connecting portion being located under the radiator, two sides of a top edge of the connecting portion extending upward to form the first grounding portion and the second grounding portion, the first grounding portion being spaced from the second grounding portion, a lower half of the feeding portion being located between the first grounding portion and the second grounding portion, the first grounding portion and the second grounding portion being spaced from the feeding portion;

wherein the feeding portion, the first grounding portion and the second grounding portion form a coplanar waveguide structure.

18. An antenna structure, comprising:

a substrate;

a radiator mounted at an upper portion of a front surface of the substrate, the radiator having a first radiating portion, one side of a lower edge of the first radiating portion extending downward to form a second radiating portion, two portions of a middle of the lower edge of the first radiating portion extending downward to form a third radiating portion and a feeding portion, the third radiating portion being spaced from the feeding portion, the feeding portion being located between the second radiating portion and the third radiating portion, and a free end of the feeding portion being a feeding end, a lower portion of one side edge of the first radiating portion being recessed inward to form a recess; and a grounding element mounted at a lower portion of the front surface of the substrate, the grounding element having a first grounding portion, a second grounding portion and a connecting portion, the connecting portion being located under the radiator, two sides of a top edge of the connecting portion extending upward to form the first grounding portion and the second grounding portion, the first grounding portion and the second grounding portion being located to two sides of the feeding portion, respectively, the first grounding portion and the second grounding portion being spaced from the two sides of the feeding portion, respectively, the free end of the feeding portion facing towards a middle of the top edge of the connecting portion, the free end of the feeding portion being spaced from the middle of the top edge of the connecting portion;

wherein the feeding portion, the first grounding portion and the second grounding portion form a coplanar waveguide structure.

* * * * *